(12) United States Patent
Niemann

(10) Patent No.: US 7,336,160 B2
(45) Date of Patent: Feb. 26, 2008

(54) DEVICE FOR READING OUT FROM SENSORS IN THE ENGINE COMPARTMENT OF A MOTOR-VEHICLE

(75) Inventor: Thomas Niemann, Delmenhorst (DE)

(73) Assignee: Hella KGaA Hueck & Co., Lippstadt (DE)

( * ) Notice: Subject to any disclaimer, the term of this patent is extended or adjusted under 35 U.S.C. 154(b) by 174 days.

(21) Appl. No.: 11/105,299

(22) Filed: Apr. 13, 2005

(65) Prior Publication Data

US 2005/0237169 A1  Oct. 27, 2005

(30) Foreign Application Priority Data

Apr. 22, 2004 (DE) .................... 10 2004 019 572

(51) Int. Cl.
*B60Q 1/00* (2006.01)
(52) U.S. Cl. .............. 340/436; 340/439; 340/440; 340/441; 340/572.4; 340/572.7; 340/539.22; 340/545.2; 340/545.3; 340/549
(58) Field of Classification Search ............ 340/438, 340/439, 440, 441, 572.4, 572.7, 539.22, 340/436, 545.2, 545.3, 549
See application file for complete search history.

(56) References Cited

U.S. PATENT DOCUMENTS

| 4,075,632 | A | * | 2/1978 | Baldwin et al. ............ 342/51 |
| 5,153,583 | A | * | 10/1992 | Murdoch ................. 340/10.34 |
| 5,421,193 | A | * | 6/1995 | Carlin et al. ................. 73/49.2 |
| 5,749,060 | A | | 5/1998 | Graf et al. .................. 340/439 |
| 6,188,954 | B1 | | 2/2001 | Hettich et al. .............. 701/115 |
| 2003/0080862 | A1 | * | 5/2003 | Kranz ........................ 340/442 |
| 2005/0143881 | A1 | | 6/2005 | Taulbut ....................... 701/29 |

FOREIGN PATENT DOCUMENTS

| DE | 43 34 595 | 4/1995 |
| DE | 197 29 959 | 12/2000 |
| EP | 0 563 713 | 10/1993 |
| EP | 1 022 548 A1 | 7/2001 |
| WO | WO 01/44758 | 6/2001 |
| WO | WO 01/84090 | 11/2001 |
| WO | WO 03/042573 | 5/2003 |

* cited by examiner

*Primary Examiner*—Tai Nguyen
(74) *Attorney, Agent, or Firm*—Collard & Roe, P.C.

(57) ABSTRACT

In a device for reading out from sensors in a motor vehicle, the sensors can be read out particularly easily if each sensor has a transponder, the motor-vehicle has a coil provided for the energy transmission and the motor-vehicle has at least one reading antenna for the sensors to be read out.

9 Claims, 3 Drawing Sheets

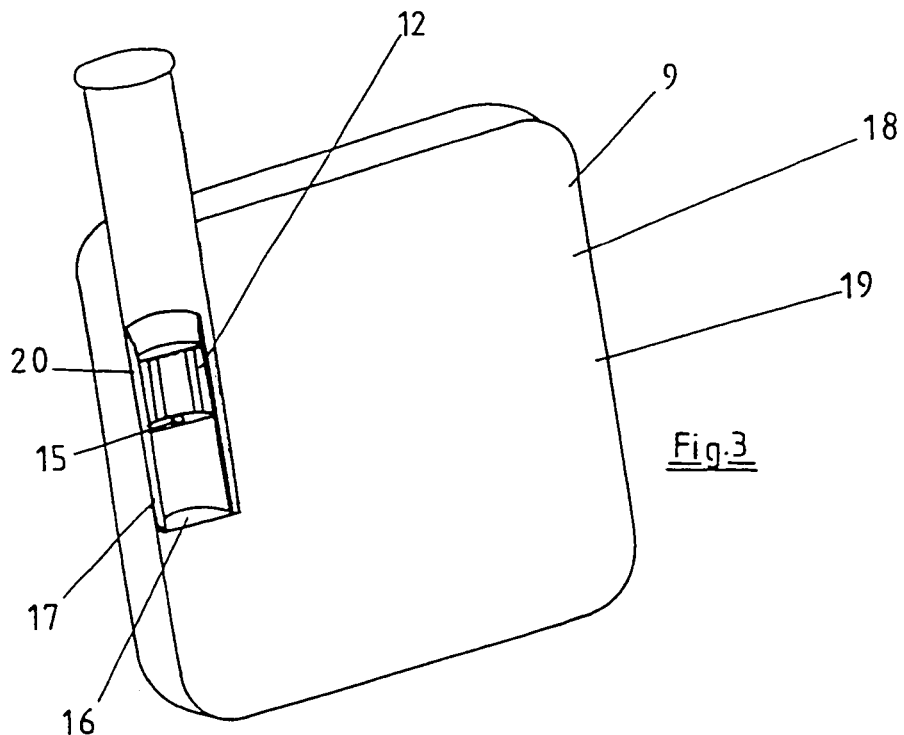
Fig.3
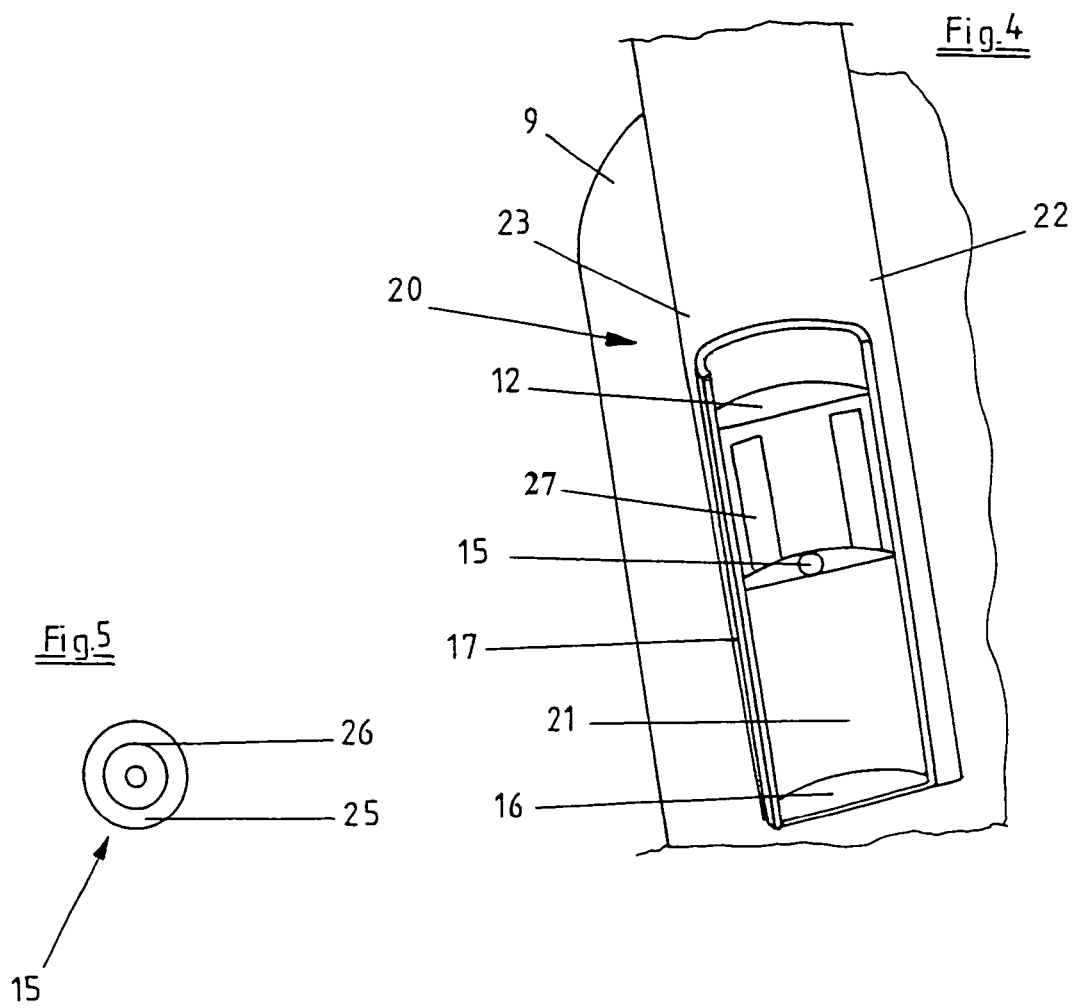
Fig.4
Fig.5

DEVICE FOR READING OUT FROM SENSORS IN THE ENGINE COMPARTMENT OF A MOTOR-VEHICLE

CROSS REFERENCE TO RELATED APPLICATIONS

Applicant claims priority under 35 U.S.C. §119 of German Application No. 10 2004 019 572.2 filed Apr. 22, 2004.

BACKGROUND OF THE INVENTION

1. Field of the Invention

The present invention relates to a device or system for reading out from sensors in the engine compartment of a motor-vehicle.

2. The Prior Art

A large number of sensors, in particular sensors for ascertaining various components and levels, are usually provided in the engine compartment of a motor-vehicle. In particular, sensors for determining the level of liquids, fuel for example, are known. As a rule, the level of the respective liquids is measured. It is also known to carry out a status measurement for several of these liquids. The data obtained from the respective sensors are as a rule passed on via cable lines to central or decentralized computing units.

SUMMARY OF THE INVENTION

The problem underlying the invention is to provide a device of the type mentioned at the outset, with which sensors in the engine compartment of a motor vehicle can be read out particularly easily.

The solution to this problem takes place with a device in accordance with the invention as described below. Advantageous developments of the invention are also described below.

The essence of the invention with a device for reading out from sensors in a motor-vehicle is that provision is made such that each sensor to be read out has a transponder, that the motor-vehicle has a transponder provided for energy transmission and that the motor-vehicle has a reading antenna for the sensors to be read out. With such a device according to the invention, wherein the sensor is designed as a transponder, a weight reduction, a simplified final assembly of the vehicle, a simplified dismantling of the vehicle, greater design freedom, increased service comfort and, in general, a smaller number of components and thus lower component costs and a smaller number of system failures are achieved compared with conventional level systems. The device is preferably designed as an RFID (radio-frequency identification) technique.

Preferably, sensors are to be read out in the engine compartment of a motor-vehicle. For this purpose, a coil provided for energy transmission is arranged, in particular centrally or symmetrically, on the engine hood, in particular on the underside of the engine hood, and a reading antenna for the sensors to be read out is arranged on the engine hood or on the underside of the engine hood. The sensors in the area of the engine compartment are of particular importance. In principle, however, sensors that are arranged outside the engine compartment can also be covered by the invention.

In a preferred form of embodiment, the coil provided for the energy transmission in the engine compartment can in principle be identical to the reading antenna for reading out the sensor or sensors. It is particularly preferable, however, to design the coil provided for the energy transmission separate from the reading antenna or antennas, so that there are thus at least two separate coils. Particularly preferably, an assigned reading antenna is present for each sensor to be read out arranged in the engine compartment. The reading antennas are preferably designed as coils. Furthermore, it is advantageous for the reading antennas each to be arranged directly above the respective sensor to be read out. To advantage, the coil provided for the energy transmission is matched in its dimensions to the dimensions of the engine compartment or in particular the engine hood and is thus designed as large as possible and can in this way produce a particularly good energy transmission. The reading antennas are preferably arranged inside the coil provided for the energy transmission. In the individual case, individual reading antennas or a few reading antennas can also be arranged outside the coil provided for the energy transmission on the basis of the special arrangement of individual sensors. The signal emitted by the coil provided for the energy transmission serves on the one hand for the energy transmission and is at the same time used as an input signal. The output signal then emitted from the sensor is picked up and evaluated by the reading antenna. In another form of embodiment, energy transmission and signal generation and evaluation can also be completely separate from one another. The reading antenna then both emits the input signal to the transponder and also receives the output signal of the transponder.

In a preferred form of embodiment of the invention, there is arranged in the motor vehicle a central reading device, which is connected to the coil for the energy transmission and to a reading antenna.

The sensors are preferably arranged on floats. In this way, the sensors can sense the level of various liquids. These liquids can be, for example, wiper water, coolant, service oil, brake fluid, engine oil, battery acid, gear oil, hydraulic oil, refrigerant and/or fuel. In a preferred form of embodiment of the invention, the sensor performs a direct measurement of the float position. In such a direct measurement, a distance measurement between the sensor, or a transponder chip arranged therein, and the assigned reading device is performed. That is to say that the signal emitted from the transponder and received by the reading antenna is evaluated in terms of its distance-related change. Depending on the system used, this change can be a change in the oscillation, the frequency and/or the amplitude. In another preferred form of embodiment, which can also be selected in parallel to the direct measurement, the sensor performs an indirect measurement of the float position. There is integrated into the sensor an ultrasound sensor or another sensor, which measures the float height from the bottom of the liquid-filled vessel and transmits the result thereby obtained to the reading antenna. This indirect measurement takes place because the measurement of the ultrasound sensor changes the signal radiated by the transponder. A change in the frequency, in particular, is preferred. Changes in the amplitude are however also possible. Each ultrasound sensor preferably has a transmitting membrane and a receiving membrane. The ultrasound sensors are preferably designed in microsystem technology. The receiving membrane is preferably designed annular or circular and honeycombed and arranged inside an annular transmitting membrane. In particular, during performance of the two measuring methods, the sensor signal can additionally be evaluated with regard to the quality of the medium detected by the sensor signal. The transit time inside the medium is, apart from the distance covered, also dependent on the medium itself, or the quality of the medium, and therefore permits, with the height or position of the sensor known by direct measurement, an evaluation with respect to the quality of the medium detected. In addition, the sensor can also have other components for the performance of measurements of the quality of the medium.

In another preferred embodiment of the invention, a sensor is designed as an oil sensor. An additional signal transmission device is assigned to the oil sensor. The reason for this arrangement, in particular, is that the oil sensor is typically arranged beneath the motor unit and a direct detection of the sensor arranged in the oil sensor by the reading antenna arranged in the engine hood is thus not possible. The signal transmission device is preferably designed in such a way that, in the engine compartment in the area of the reading antenna which is assigned to the oil sensor and arranged on the engine hood, there are arranged a coil and a second reading antenna, and that the coil is connected to a second coil in the area of the oil sensor. By means of such a system, the wireless transmission first takes place between the coils in the engine hood and a receiving system in the upper area of the engine compartment, and the signals are then relayed via a connection to a second coil beneath the engine in the area of the oil sensor. The connection between the first coil and the second coil is preferably made via an oil dipstick. The oil dipstick thus assumes a dual function. Since the oil level is measured during running in the case of more recent oil measuring systems, the measurement of the oil level in the rest state of the engine also continues to be possible by means of the dipstick provided here and offers the known assistance when topping up with oil.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views:

FIG. 3 shows a liquid receptacle with a sensor;

FIG. 4 is an enlarged detail of the liquid receptacle shown in FIG. 3; and FIG. 5 is a schematic diagram of an ultrasound sensor constructed in microsystem technology.

DETAILED DESCRIPTION OF PREFERRED EMBODIMENTS

Figure 1:
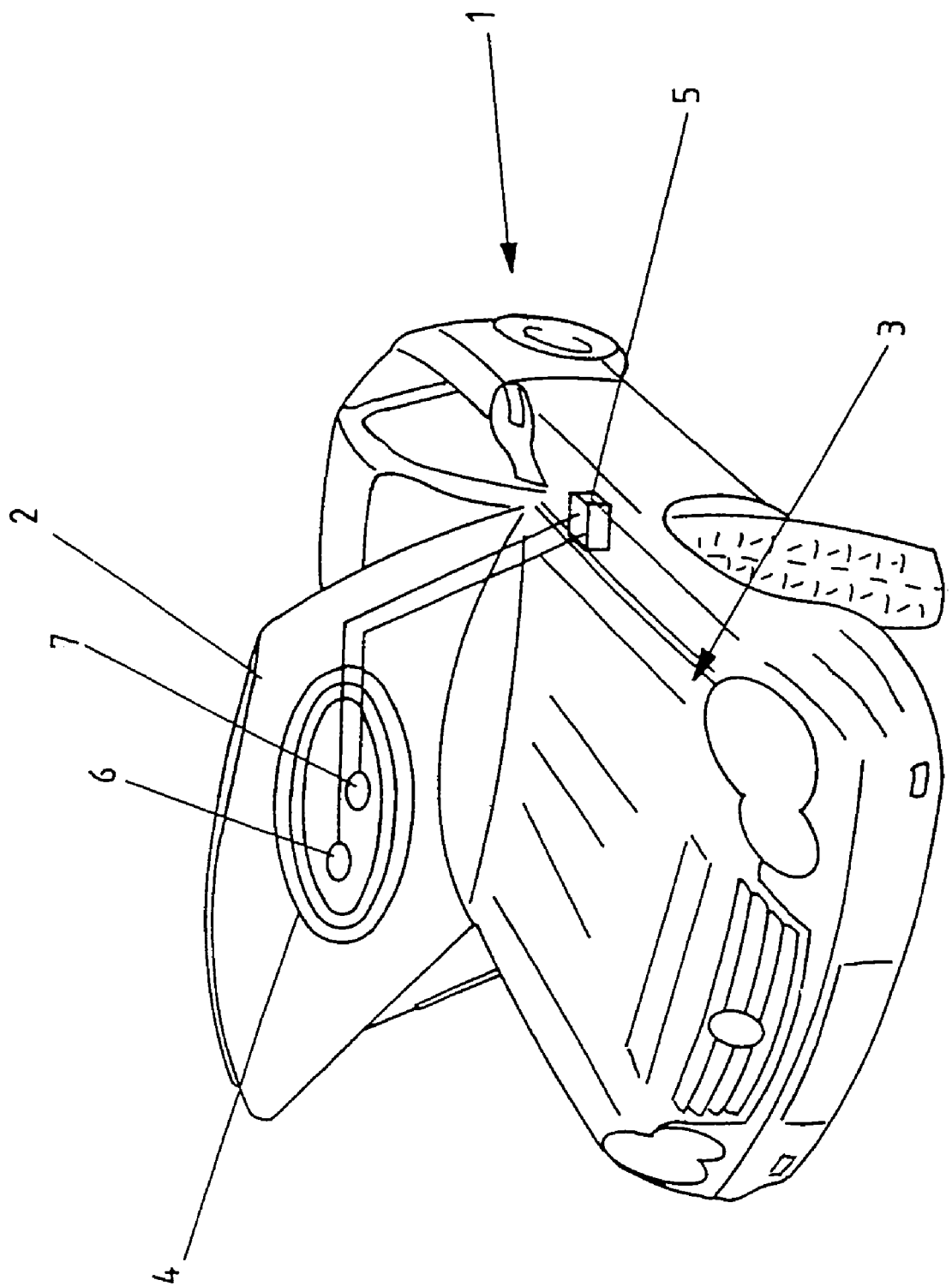
FIG. 1 is a perspective view of a motor vehicle with opened engine hood.

A motor vehicle 1 with opened engine hood 2 is shown in perspective view in FIG. 1. A large number of sensors are usually provided in an engine compartment 3, the sensors serving in particular to check the level of various liquid receptacles. According to the invention, a wireless transmission of the data ascertained by the sensors to a central reading device 5 takes place here, the central reading device being arranged in the bodywork of motor-vehicle 1. One or more coils or antennas are arranged at the underside of engine hood 2, preferably using a film technique. A central antenna 4 is represented here, which is designed comparatively large and can also be designed still larger, so that it extends virtually over the whole of engine compartment 3 lying beneath. This central antenna or energy coil 4 serves for the energy supply of the sensors arranged in engine compartment 3, in particular their transponder chips. There are shown here inside central energy coil 4 further signal-reading antennas 6 and 7, which are positioned as directly as possible over the sensors arranged in engine compartment 3. These antennas serve to read out the signals emitted by the sensors, in particular the transponder chips. Signal-reading antennas 6 and 7 are also in a data connection with central reading device 5.

Figure 2:
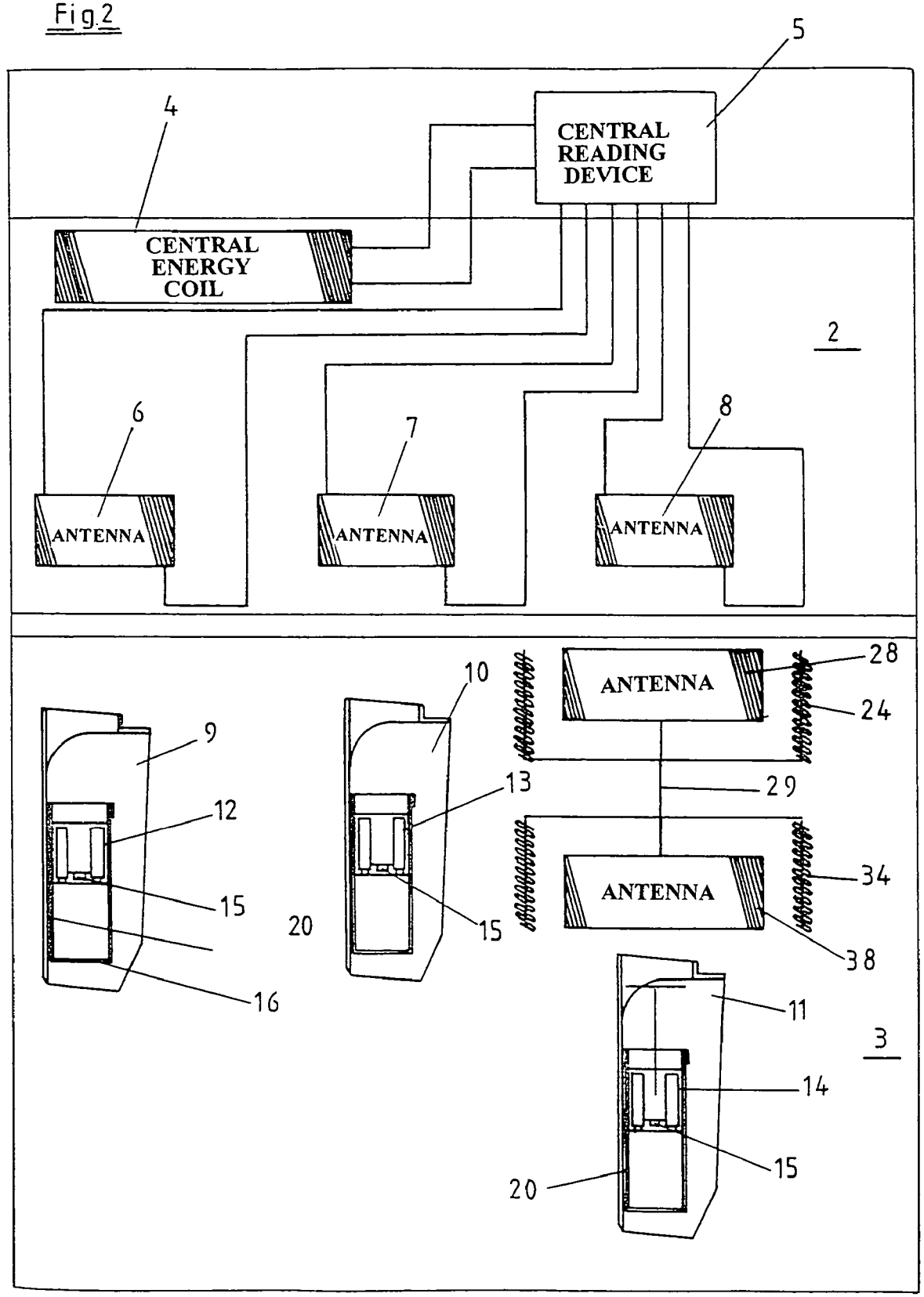
FIG. 2 is a diagrammatic overall view of the device.

The design is further explained in FIG. 2. Central reading device 5 is arranged in the bodywork of the motor vehicle. Engine hood 2 is reproduced in the area thereunder. Central energy coil 4 and a plurality of signal-reading antennas are arranged on the underside of engine hood 2. Three signal-reading antennas 6, 7 and 8 are shown here by way of example. To advantage, precisely one signal-reading antenna is assigned to each sensor to be read out, the signal-reading antenna being arranged as directly as possible above this sensor. Signal-reading antennas 6, 7 and 8 are connected, just like central energy coil 4, to central reading device 5. There are indicated diagrammatically in engine compartment 3 several liquid receptacles 9, 10 and 11, in which, in a device 20 provided for the purpose, a float 12, 13, 14 rises or falls according to the level in respective receptacle 9, 10, 11. Arranged at the lower end region of each of the floats is a sensor 15, which communicates with the respectively assigned signal-reading antenna. This arrangement requires that the level must be determined that can be ascertained from the distance of sensor 15 from the bottom of the receptacle. Since the position of the level-measuring device designated as a whole by 20, in which floats 12, 13, 14 move, is known, the level can also be ascertained via the distance of sensor 15 from the bottom of the device, in which a reflector 16 is arranged. The distance between sensor 15 and reflector 16 can on the one hand be ascertained by a direct measurement of the distance between sensor 15 and the assigned signal-reading antenna. Alternatively, this determination can also take place with a distance measurement between sensor 15 and reflector 16, whereby this result is then transmitted by sensor 15 to the signal-reading antenna. One might speak here of an indirect measurement. Here, in the example of embodiment shown, such measurements can be carried out without problem on liquid receptacles 9 and 10. Liquid receptacle 11 is intended to represent a liquid receptacle for oil, which is arranged beneath the engine, so that a direct communication between sensor 15 of float 14 and signal-reading antenna 8, which is arranged above, is not possible. In order to get round this problem, there is provided in the upper area of engine compartment 3 a decentralized energy coil 24, which communicates with central energy coil 4, and a decentralized signal-reading antenna 28, which communicates with signal-reading antenna 8. Via a connection 29, which is preferably formed by an oil dipstick, decentralized coil 24 is connected to a decentralized coil 34 arranged beneath the engine compartment, via which decentralized coil the energy transmission to sensor 15 of float 14 takes place. Also provided in the lower area of engine compartment 3, i.e. beneath the engine, is a decentralized signal-reading antenna 38, which is also connected by a connection 29 to signal-reading antenna 28. The signal emitted by sensor 15 of float 14 is thus first picked up by the decentralized signal-reading antenna 38, routed via connection 29 to decentralized signal-reading antenna 28 and read out there by signal-reading antenna 8 and then passed on to central reading device 5.

A liquid receptacle 9 with a level-measuring device 20 arranged therein is shown in FIG. 3. An enlarged detail of level-measuring device 20 is shown in FIG. 4. Liquid receptacle 9 serves to hold a liquid, water for example. The liquid should be between a lower minimum level 19 and an upper maximum level 18. The level is checked with the aid of level-measuring device 20. For this purpose, level-measuring device 20 has a housing 17 designed as a tubular sleeve, in which a float 12 is arranged, which rises and falls according to the level. Sensor 15 is arranged in the lower end region of float 12. A reflector 16 is arranged in the lower end region of housing 17.

As can be seen more clearly in FIG. 4, a transit-time measurement 21 between sensor 15 and reflector 16 can produce a measure for the distance between sensor 15 and reflector 16. As indicated by arrow 22, a signal h•$f_{read}$, which emerges from energy coil 4, is received by the sensor and, transformed according to the performed transit-time measurement, is emitted by sensor 15 as h•$f_{trans}$, designated by 23, and picked up by the signal-reading antenna. Alternatively, or in addition, the direct distance between sensor 15 and signal-measuring antenna 6 can also be measured. Float 12 of level-measuring device 20 also has an annular metal sheath 27.

An ultrasound sensor 15 in microsystem technology for the performance of the transit-time measurement is shown in FIG. 5. An outer part of a membrane, which is designed annular, is designed as transmitter 25, and an inner part of a membrane is designed as receiver 26.

Although only a few embodiments of the present invention have been shown and described, it is to be understood that many changes and modifications may be made thereunto without departing from the spirit and scope of the invention as defined in the appended claims.

What is claimed is:

1. A reader system for sensors in a motor vehicle having an engine hood and an engine compartment comprising:
    (a) a plurality of sensors disposed in the motor vehicle, each sensor having an associated transponder, at least some of the plurality of sensors being disposed in the engine compartment, and at least one sensor comprises an oil sensor and a signal-transmission device is assigned to the oil sensor;
    (b) an energy-transmitting coil arranged on the engine hood for reading signals from the sensors in the engine compartment;
    (c) at least one signal-reading antenna arranged on the engine hood for reading, signals from the sensors;
    (d) a first coil; and
    (e) a second coil connected to said first coil near the oil sensor;
    wherein said at least one signal-reading antenna comprises a first signal-reading antenna and a second signal-reading antenna, said first signal-reading antenna being associated with the oil sensor and arranged on the engine hood, said first coil and said second signal-reading antenna being arranged in the engine compartment near the first signal-reading antenna.

2. The system according to claim 1, wherein said energy-transmitting coil is sized to correspond with dimensions of the engine compartment.

3. The system according to claim 1, further comprising a central reading device arranged in the motor vehicle and connected to said energy-transmitting coil.

4. The system according to claim 1, wherein said sensors are arranged on a float.

5. The system according to claim 4, wherein at least one sensor directly measures float position.

6. The system according to claim 4, wherein at least one sensor indirectly measures float position.

7. The system according to claim 1, wherein each sensor has a transmitting membrane and a receiving membrane.

8. The system according to claim 1, wherein a sensor signal can be evaluated in respect of a quality of a medium detected by the sensor signal.

9. The system according to claim 1, wherein the first coil and the second coil are connected via an oil dipstick.

* * * * *